Patented Nov. 20, 1934

1,981,722

UNITED STATES PATENT OFFICE 1,981,722

MANUFACTURE AND PRODUCTION OF POROUS RUBBER

Rudolf Ditmar, Graz, Steiermark, Austria, assignor, by mesne assignments, to Rudolf Heinrich Koppel, Aachen, Germany No Drawing. Application June 27, 1932, Serial No. 619,521. In Germany July 15, 1931

5 Claims. (Cl. 18—53)

This invention relates to the manufacture and production of porous rubber masses (so-called "cellular rubber") including micro-porous rubber and has for its object to provide an improved process for this purpose.

Porous rubber of the said kind may be prepared by mixing a propellant with the raw rubber mixture.

As propellants for the said purpose, aqueous ammonia solutions or solid ammonium bicarbonate have for example been employed. These, and also all other propellants hitherto known, have certain disadvantages, however, especially because they have an injurious effect on the stability and life of the products prepared therewith.

According to this invention the preparation of porous rubber masses of the said kind is effected with the employment of a propellant consisting of a substance which has proved especially suitable for this purpose because it has an excellent, but quite uniform, blowing action without any injurious influence on the cellular rubber product to be prepared and therefore yields a product which is superior in every respect to those prepared by the use of the propellants hitherto known.

I have found that a specially advantageous effect of the said kind, in particular a very uniform formation of cells, is obtained by using urea as the propellant. This agent is added on the mixing rollers to the raw rubber mixture prepared in the usual manner and the mixture thus obtained is vulcanized in free air or in vulcanizing moulds which are not closed in an airtight manner and which are incompletely, or only partly, filled by the mixture. The material swells up and an entirely uniform cellular rubber is obtained, especially when working without counter-pressure in the vulcanizing channel or chamber.

The mixture increases considerably in volume during the vulcanization and finally fills the whole space in the mould. The size of the cells in the vulcanization product may be regulated by varying the amount of urea added, by limiting the volume which the mixture can fill and by varying the vulcanization conditions, namely the temperature and duration of the vulcanization.

The amount of urea to be added thus varies. An excellent cellular rubber having pores of normal size may be obtained for example by an addition of from 15 to 20 per cent of urea to the raw rubber mixture which, in addition to raw rubber and sulphur, contains the usual organic and inorganic additions in the most suitable proportions.

When employing urea in the specified percentage amounts, the mould is only filled to about two thirds of its volume, placed in an airbath and the temperature raised slowly to 122° centigrade within about 45 minutes. The material remains at this temperature for a further 45 minutes and is then allowed to cool.

The resulting cellular rubber may be readily lifted out from the mould and has a skin at the boundaries of the mould.

By reducing the amount of urea added and preferably by simultaneously increasing the vulcanization temperature, the size of the pores of the vulcanization product may be diminished, and this renders it possible to employ the process according to this invention for the preparation of microporous rubber masses, as for example rubber erasers.

The microporous products, prepared in an analogous manner likewise while employing urea as the propellant, have the advantage, contrasted with the rubber eraser products hitherto known, that they require a considerably smaller addition of sulphurized oils (factice) in order to render them soft and capable of application to the surface to be erased and therefore they have not the faults of the rubber eraser products hitherto known which reside in the stickiness and tendency to ageing caused by the high factice content.

The following example will further illustrate the application of the present invention to the manufacture of microporous rubber masses, but the invention is not restricted to this example.

Example

Urea is added in an amount of from 7 to 10 percent to a raw rubber mixture the factice content of which has been correspondingly reduced and the mixture is introduced into flat moulds so that it only fills them to about ¾ of their volume and vulcanization is then carried out at about 143° centigrade within about 50 minutes without increase in temperature.

The resulting product has a microporous structure and, after cooling, may be lifted out from the mould as a finished rubber eraser.

It is to be understood that modifications may be made in this example without departing from the scope of the invention.

Having now particularly described and ascertained the nature of my said invention and in what manner the same is to be performed, I declare that what I claim is:—

1. A process for producing coarse rubber comprising adding urea as a blowing agent to a raw rubber mixture in an amount equal to from 15% to 20% to the raw rubber mixture, and vulcanizing the mixture under substantially atmospheric pressure at about 122° C. for about forty-five minutes.

2. A process for producing microporous rubber comprising adding urea as a blowing agent to a raw rubber mixture in an amount equal to from 7% to 10% to the raw rubber mixture, and vulcanizing in partially filled moulds at about 143° C. for about fifty minutes.

3. A process for producing porous rubber comprising forming a raw rubber mixture containing urea in an amount sufficient to constitute a blowing agent, filling a mold only partially with the mixture and vulcanizing the mixture in the mold and puffing the mixture by the action of urea during vulcanization and filling the mold with porous vulcanized rubber.

4. A process for producing porous rubber comprising forming a raw rubber mixture containing urea, the amount of urea being at least 5% of the amount of rubber in the mixture, vulcanizing the mixture under pressure not materially exceeding atmospheric and puffing the material during vulcanization by the action of the urea, the vulcanizing temperature increasing as the percentage of urea in the mixture is decreased.

5. A process for producing porous rubber comprising forming a raw rubber mixture containing from 7% to 20% urea filling a mold not over ¾ full of the mixture, vulcanizing the mixture in the mold at a temperature from 122° C. to 143° C. and puffing the mixture during vulcanization to fill the mold by the action of the urea.

RUDOLF DITMAR.